United States Patent [19]
Williams et al.

[11] Patent Number: 5,664,372
[45] Date of Patent: *Sep. 9, 1997

[54] CLUTCHLESS SCREW DRIVE DOOR OPERATOR

[75] Inventors: Gregory Ernest Williams, Minerva; James Allen White, Louisville; Nicholas A. Dragomir, Alliance; James William Stottsberry, Massillon, all of Ohio

[73] Assignee: GMI Holdings, Inc., Alliance, Ohio

[*] Notice: The term of this patent shall not extend beyond the expiration date of Pat. No. 5,568,704.

[21] Appl. No.: 704,274

[22] Filed: Aug. 28, 1996

Related U.S. Application Data

[63] Continuation of Ser. No. 409,425, Mar. 24, 1995, Pat. No. 5,568,704.

[51] Int. Cl.$^6$ .................. E05F 11/34; E05F 11/40
[52] U.S. Cl. .................. 49/362; 49/199; 49/200
[58] Field of Search .................. 49/362, 199, 200; 403/383, 361; 464/41, 42, 45, 180, 182; 192/7

[56] References Cited

U.S. PATENT DOCUMENTS

| | | | |
|---|---|---|---|
| 2,056,174 | 10/1936 | Earhuff et al. | 172/239 |
| 2,944,810 | 7/1960 | Stuettig et al. | 268/59 |
| 3,990,802 | 11/1976 | Corona | 403/24 |
| 4,131,830 | 12/1978 | Lee et al. | 318/266 |
| 4,362,412 | 12/1982 | Kunz | 403/11 |
| 4,821,456 | 4/1989 | Nogaki | 49/362 |

OTHER PUBLICATIONS

Pp. 7, 8, and 25 of the Stanley Owner's Manual for its screw drive door opener model No. SD550.F00.

Copy of Statement filed Oct. 12, 1996 in Serial No. 08/409,425.

Prior Commercial Version of Chamberlain Garage Door Opener System G6463 (two sheets).

*Primary Examiner*—Kenneth J. Dorner
*Assistant Examiner*—Curtis Cohen
*Attorney, Agent, or Firm*—Beveridge, Degrandi, Weilacher & Young, LLP

[57] ABSTRACT

A garage door operator is disclosed to have a front coupling for a threaded screw of the operator and the rotor of the motor. The coupling includes a first coupling device that is a unitary coupling member with opposing recesses for receiving each of the rotor shaft and an end portion of the screw. The unitary coupling member thereby connects the screw to the motor for torque transmission from the motor. The second coupling device includes a thrust containment device that is supported on the screw, and an intermediate assembly disposed between the thrust containment device and an end portion of the guide rail of the door operator. A retainer component of the intermediate assembly restricts expansion of the thrust containment device.

8 Claims, 4 Drawing Sheets

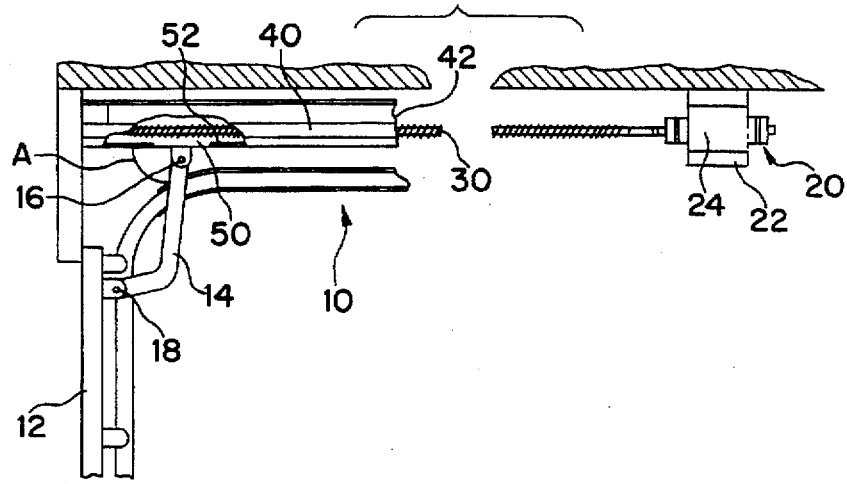
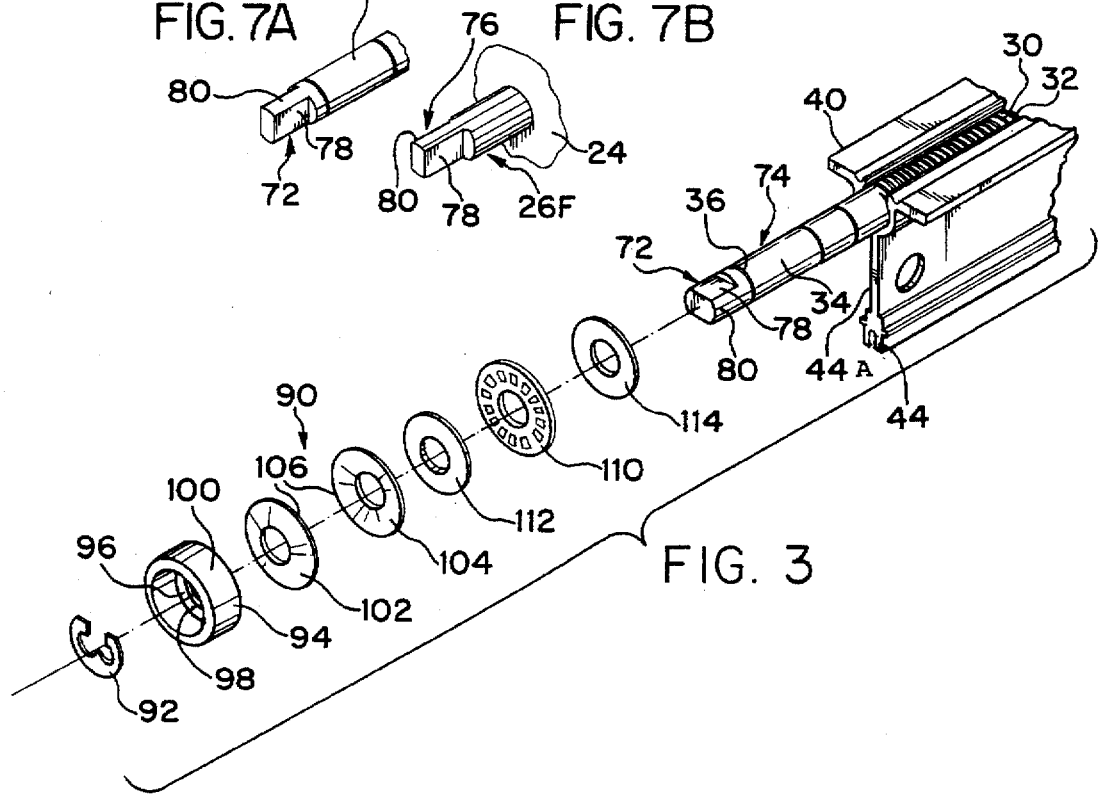

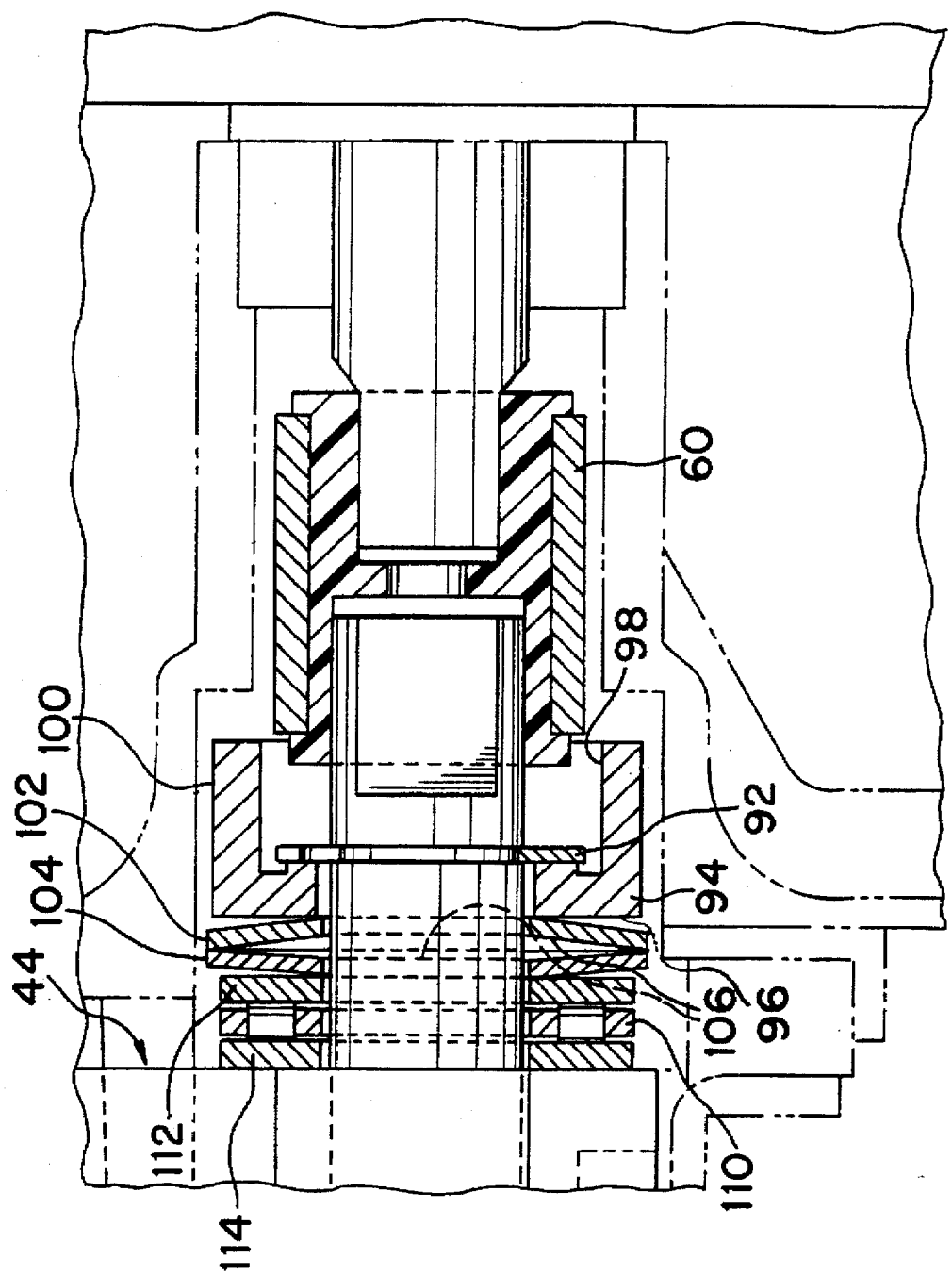

CLUTCHLESS SCREW DRIVE DOOR OPERATOR

This is a continuation of application Ser. No. 08/409,425 filed Mar. 24, 1995, now U.S. Pat. No. 5,568,704.

BACKGROUND OF THE INVENTION

Garage door operators frequently are sold in the retail market. As such, it is important to provide them to the consumer in a way that makes them easy to install. Generally, two distinct types of door operators have been developed. One general type of operator available is a cable-operated or chain-operated door opener. Representative of these are U.S. Pat. No. 3,439,727 and U.S. Pat. No. 3,444,650. This invention relates primarily to the other general type, which type includes a longitudinally stationary, but rotatable screw which acts on a travelling or "partial" nut.

A door operator with single-piece screw, such as disclosed by U.S. Pat. No. 2,056,174, has been available for many years. Since more recently, a sectioned-screw arrangement has been available as seen from U.S. Pat. No. 4,352,585 that shows a door operator with sectioned screw parts disconnected at the time that the door operator is shipped to the customer. Also, U.S. Pat. No. 4,241,540 shows a folding screw arrangement in which the screw parts are interconnected by a coupling pivotably connecting each pair of screw parts.

U.S. Pat. No. 4,352,585, for example, provides a greatly improved coupling arrangement between individual screw sections. However, it does not address the screw-to-motor connection.

Up to now, in many screw drive door operators, the motor for driving the screw has included a hollow rotor which telescopically receives an end portion of the screw. Behind the motor, a clutch assembly provides the driving connection between the hollow rotor and the section of screw extending therethrough. The clutch could be adjustable to provide for varying the amount of torque transmitted from the motor rotor to the screw. Thus, in this type of door operator arrangement, the installer is required to insert the screw (or a section thereof) into the hollow rotor and then adjust the clutch to provide the proper amount of torque transmission from the motor to the screw.

Rear-mounted clutch assemblies may include a number of different elements to effect the driving connection between the screw and rotor, and therefore such rear-connection installation process can be complicated. If the rear clutch connection is made improperly, this could lead to noisy operation and also increase the chance of premature deterioration and even failure of the door operator. Further, the presence of a rear-connection clutch assembly significantly adds to the overall cost in manufacturing of a screw drive door operator. It also necessitates a hollow rotor assembly for the motor.

Whether the screw is front or rear connected, it is advantageous to include a device for absorbing longitudinal thrust occurring as a result of rotation of the screw in both directions. The screw undergoes substantial compression when the door opener is operated to lower the door because as the screw rotates to cause the slide or traveler to push against the stationary door in order to lower it, the inertia of the door exerts force back against the screw and therefore the motor. It is for this reason that U.S. Pat. No. 4,352,585 describes that the door operator has a motor shaft with bearings that include thrust bearings. The thrust bearings absorb the longitudinal thrust in both drive directions. The thrust absorption requirement presents a problem in developing a frontal connection between the screw and the motor, which frontal connection does not require a clutch.

Further, in both screw drive and chain drive operators, security against "back drive" of the door operator is of concern. "Back drive" is referred to as the condition where attempts are made at unauthorized opening of a garage door held closed by a door operator. During an attempt at unauthorized opening of the door, force exerted against the door is transmitted to the motor by either the screw in a screw drive operator, or the chain in a chain drive operator, and if sufficient, the transmitted force rotates the motor rotor in a direction opposite to the direction in which it rotated to close the door. In a screw drive operator, for example, when the door arm connects to the slide or traveler at substantially 90° with respect to the longitudinal direction of the screw, and the screw is approximately horizontal, there is little concern that the motor could be back driven because all of the force exerted in attempting to unauthorizedly open the door is exerted perpendicular (in the Y-direction) to the screw. However, if the door arm and the section of screw intermediate the door arm and the door form an acute angle (for instance angle A in FIG. 1), there will be a force component along the axial direction of the screw (X-direction). If this force is sufficient, in the absence of a back drive preventing device, the force will urge the traveler to move back toward the motor, thus causing the screw to rotate. Rotation of the screw in turn causes the motor rotor to rotate. As the traveler moves rearwardly, the door arm rotates about a pivot point on the traveler such that the aforementioned angle becomes more acute and the force component in the longitudinal direction of the screw becomes greater. This force component, in the absence of a brake or other anti-back drive device for the motor, thus back drives the motor whereupon unauthorized entry can be accomplished.

SUMMARY OF THE INVENTION

A screw drive operator in accordance with the present invention omits the conventional rear-attachment clutch and hardware associated therewith, and provides a simplified front coupling arrangement that also obviates a front mounted clutch. The present invention thus greatly simplifies installation of the door operator. The present invention also overcomes the problem of thrust containment in a front connected screw arrangement. It also achieves quiet performance while at the same time achieving enhanced security for the enclosed area. It further achieves significant manufacturing cost reductions by omitting the clutch connection between the motor and the screw.

As opposed to prior, rear mounted clutch arrangements, with the door operator of the present invention, there is no need to fit the motor with a hollow rotor. The present invention includes a coupling assembly that has a first coupler which connects the rotor to the threaded screw for direct transmission of torque, along the axis of the screw, from the rotor to the threaded screw. In a preferred embodiment, this first coupler is an integrally-formed polymer element which acts as a universal joint. The preferred connective element dampens noise to provide for quiet operation.

The coupling means in accordance with the present invention also includes a second coupler. The second coupler is located on the screw, intermediate the first coupler and an edge of the guide rail at the end portion of the guide rail which is nearest the housing that contains the drive motor.

The second coupler is a thrust-absorbing arrangement that is external to the motor. The second coupler thus obviates need for extensive thrust absorption equipment that in prior commercial systems, was accomplished by bearings or the like in the motor and the mounted clutch assembly. In a preferred embodiment of the second coupler in accordance with the invention, an unthreaded portion of the screw, which is proximate to the portion of the screw that engages the polymer member of the first coupler, has a circular groove in which is rotatably mounted a stop member that absorbs and thereby contains thrust loads. This preferred embodiment also concludes a retaining element that prevents the stop member from expanding radially when thrust is transmitted to the stop member. This acts to hold the stop member to within the circular groove. Next to the retaining element, a spring assembly assists the stop member by absorbing a part of the total impact load. Between this spring arrangement and the end of the guide rail that faces the motor and housing, the preferred second coupler has an assembly that both shares in thrust absorption, and substantially shields the stop member from rotating in response to rotation of the screw.

The garage door opener in accordance with the present invention, preferably also is equipped with an anti-back drive system. Provision of such an anti-back drive together with proper adjustment of the pitch angle of the door arm provides increased security against unauthorized entry of a door held closed by the operator. In a preferred embodiment of the anti-back drive system, a partially cylindrical brake member receives the motor rotor therethrough. The open end of the partially cylindrical brake member forms a brake surface which creates substantial friction when engaged with a complementary braking member. A biasing device such as a coil spring biases the complementary braking elements aparts. An attempt at unauthorized entry by pushing or pulling up on a door held closed by the door operator will overcome the bias of the biasing device and cause the complementary braking elements to frictionally engage, thereby preventing back rotation of the motor.

In summary, a garage door operator, in accordance with the invention, comprises: a motor having a stator and a rotor, said rotor having a shaft which transmits torque developed by said motor; a threaded screw having an end portion; a guide rail for at least partially containing said screw, said guide rail having a terminal end portion; coupling means for coupling said screw to said rotor shaft and absorbing thrust transmitted along said screw toward said motor when said coupling means couples said screw and said motor, said coupling means including a first coupling and a second coupling, said first coupling including a unitary coupling member which has opposing recesses for receiving each of said rotor shaft and said screw end portion therein to connect said screw to said motor for transmission of torque from said motor to said screw, and said second coupling including thrust containment means supported by said screw and means disposed intermediate said thrust containment means and said guide rail terminal end portion.

Further in accordance with the present invention, a coupling assembly for a garage door operator having a motor with a rotor shaft which transmits torque developed by the motor, a threaded screw having an end portion, and a guide rail for at least partially containing the screw, the guide rail having an end portion, comprises: a first coupling including a unitary coupling member that has opposing recesses for receiving each of the motor rotor shaft and the screw end portion therein to connect the screw to the motor for torque transmission from the motor to the screw, and a second coupling including a thrust containment means disposable on the screw, and intermediate means disposable on the screw to come into contact with the guide rail end portion, said intermediate means, on the screw, being intermediate said thrust containment means and the guide rail end portion.

BRIEF DESCRIPTION OF THE DRAWINGS

Further aspects and features of the present invention will be even more apparent from the following detailed description and drawings, and the appended claims. In the drawings:

FIG. 1 is a side elevational view, partly schematic, illustrating a garage door opener that can be equipped in accordance with the present invention;

FIG. 2B is an enlarged view of a section of FIG. 2A;

FIG. 3 Is an exploded, perspective view illustrating the individual elements of a thrust absorption assembly in connection with a screw and a guide rail;

FIG. 7A is an isolated perspective view showing the end portion of the screw as particularly adapted for receipt within the coupling member;

FIG. 7B is a view, similar to FIG. 7A, showing the end portion of the rotor shaft;

DETAILED DESCRIPTION OF THE PREFERRED EMBODIMENTS

Figure 2A:
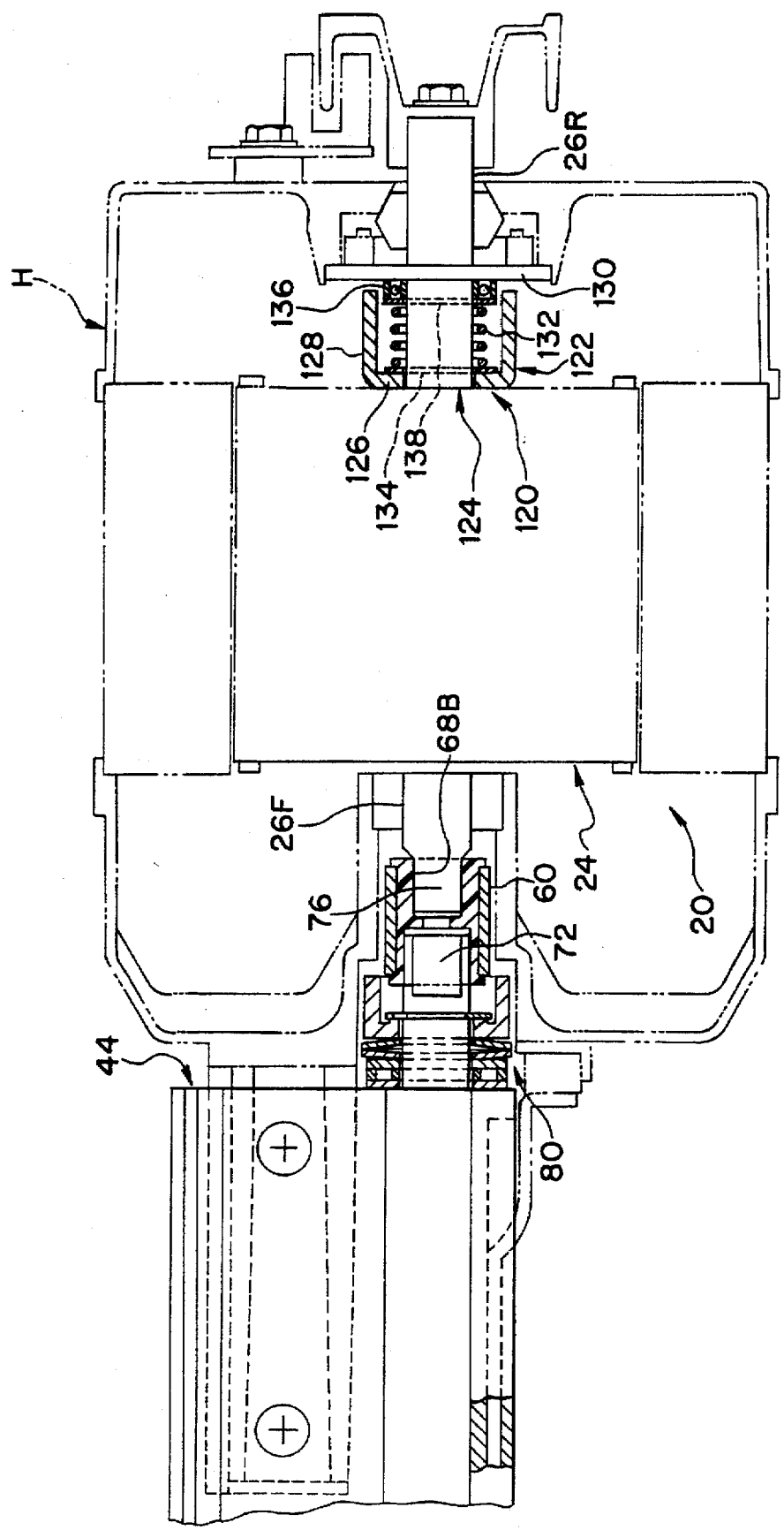
FIG. 2A is a cross-sectional view showing particulars of the present invention in connection with a garage door opener of the type shown in FIG. 1.

FIG. 1 schematically shows a garage door operator 10 equipped in accordance with the present invention. Exemplary operator 10 is of the screw drive type. This type of operator is arranged to open and close virtually any type of enclosure, including sectional doors, and slab doors. As shown, door operator 10 includes a motor 20 with a stator 22 and a rotor 24. Motor 20 drives the screw 30 to reciprocally open and close the garage door 12, which door is illustrated as a sectional door. Preferably, door operator 10 of FIG. 1 is a sectional screw drive device in that the screw 30 is divided into plural sections (individual sections not shown) which in turn are coupled as shown in detail in U.S. Pat. No. 4,352,585, the subject matter of which is incorporated herein. However, as will be apparent, screw 30 could be a unitary screw as well.

A guide assembly 40 partially surrounds screw 30 which rotates therein. Where screw 30 is apportioned into separate sections, guide assembly 40 likewise is provided as corresponding connectable sections. For the purposes of this disclosure, it is not necessary to show the separate sections of the guide assembly 40 in the drawings herewith, however, a sectioned guide assembly also is shown in U.S. Pat. No. 4,352,585. As noted from FIG. 3, guide assembly 40 has a generally cylindrical bore 42 that circumscribes about 300° of the screw 30. In the remaining approximately 60° of the periphery of the screw 30, a partial nut 50 is disposed for engagement with the screw. For a sectioned screw, the partial nut 50 has a length sufficient to bridge across the length of the screw section couplings. The guide assembly rail 40 guides the screw 30, and also the nut 50 which is part of a winged slide assembly or traveler 52 received within grooves (not shown) of the guide assembly rails. The slide 52 carries the partial nut 50. A door arm 14 is pivotally connected at 16 to the slide 52, and at 18 to the door 12. Accordingly, as the motor 20 rotates the screw 30 in either a clockwise or a counter clockwise direction, the partial nut 50 engages with the screw 30 and traverses the guide rail assembly 40 longitudinally to open or close the garage door 12.

FIG. 2A is a plan view of the housing H with the motor 20 shown as disposed therein. FIG. 2B is an enlarged view of a portion of FIG. 2A. FIG. 2A is in partial schematic form so that the rotor core 24, which actually is an assembly, and the stator 22 or field assembly of the motor 20 are visible. As so seen, rotor assembly 24 has, along the axial axis therethrough, shaft portions 26F and 26R that integrally extend from each axial end of the rotor assembly. Hereinafter, rotor shaft portion 26F will be referred to as the forward shaft portion, while the shaft portion 26R on the opposite side of rotor assembly 24 will be referred to as the rear shaft portion.

Preferred operator 10 features a coupling arrangement for connection of the screw 30 to the forward rotor shaft 26F. This coupling arrangement involves two physically-separate yet cooperating assemblies that connect the screw 30 and the forward rotor shaft 26F, and absorb thrust transmitted longitudinally along the screw. A single-piece coupling member 60 accomplishes the connection between screw 30 and the forward rotor shaft 26F, while a thrust absorption assembly performs the thrust absorption for thrust transmitted along the screw to protect the motor 20 and the coupling member 60.

Figure 4:
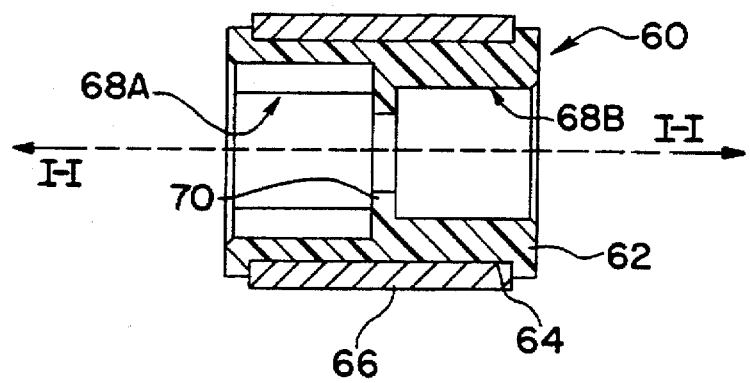
FIG. 4 is a cross-sectional view of coupling member in accordance with the present invention.
Figure 5:
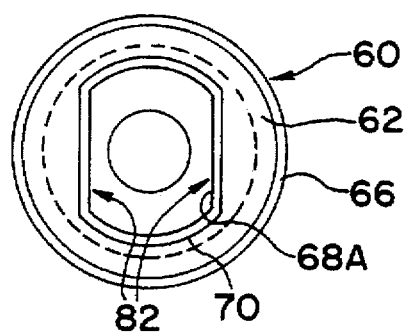
FIG. 5 is a front elevational view of one end of the coupling member of FIG. 4.
Figure 6:
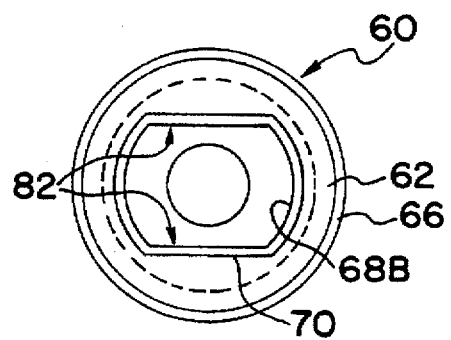
FIG. 6 is a front elevational view of the end of the coupling member opposite the end shown in FIG. 5.

Reference now will be made to coupling member 60. FIGS. 4 through 6 show preferred coupling member 60 in isolated detail. As shown, coupling member 60 provides a universal joint between the screw 30 and forward rotor shaft 26F. Preferred coupling member 60 has a single-piece polymer body portion 62 with generally cylindrical external walls 64. A polymer implementation for preferred coupler 60 serves to reduce noise in furtherance of the objective of quiet operation. Coupling member 60 preferably also includes a metallic outer collar 66 that contains the polymer body 62. Collar 66 provides increased radial strength for the composite coupling member 60.

Body 62 has two opposing recesses 68A, 68B, located at each longitudinal end thereof. A centrally-located, annular center wall 70 at least partially separates the recesses 68A, 68B from each other. Preferably, each of recesses 68A and 68B has the same configuration and the same dimensions. Recesses 68A and 68B also are centered with respect to a common axis I—I that axially runs through coupling member 60. Now, as appreciated from FIGS. 5 and 6, recesses 68A and 68B are angularly offset from each other, along axis I—I. In exemplary coupling member 60, recesses 68A, 68B are angularly offset by 90° with respect to each other.

With reference also to FIGS. 7A and 7B, the internal configuration of each of recesses 68A and 68B is complementary to the configuration of each of a tip portion 72 at which the end portion 74 of screw 30 terminates, and the corresponding tip portion 76 of the forward rotor shaft 26F. In the preferred embodiment, screw 30 and forward rotor shaft 26F generally are cylindrical. However, at the tip portions of each of screw 30 and forward rotor shaft 26F, the cylindrical shape modifies to have oppositely-facing, "flats" or flat surfaces 78 connected by an actuate surface 80 having the original cylindrical curvature. In the preferred arrangement, each of tip portions 72 and 76 has two such flat walls 78, while each of recesses 68A and 68B has two interior, complementary flat walls 82. It is the contact between the flats 78 of the forward rotor shaft tip portion 76 and the corresponding flat walls 82 of recess 68B which provide for transmission of torque from the motor rotor 24 to the coupling member 60. In the same way, the interior flat walls 82 of recess 68A contact the flats 78 of screw tip portion 72 in order to transmit torque from the coupling member 60 to the screw 30. This linkage arrangement thereby accomplishes direct transmission of torque, namely transmission of torque within the common axis of the screw 30, coupling member 60, and motor rotor 24 (i.e. axis I—I), from the forward rotor shaft 26F to the screw.

With reference now to FIGS. 2A, 2B and 3, the preferred thrust absorption assembly 90 for the coupling system of the present invention includes a series of elements carried by screw end portion 74. As best seen from FIG. 2B, elements of thrust absorption assembly 90 contact an edge 44a at a terminal end 44 (edge) of the guide rail assembly 40' and also extend to partially cover coupler member 60. Actually, FIG. 3 depicts guide rail 40, screw 30 and the thrust absorption assembly 90 (in exploded view) as upside down; this is merely to simplify the drawing. It is convenient to describe the various elements of thrust absorption assembly 90 in sequence from coupler 60, toward the guide rail assembly 40. First, the "end portion" 74 of screw 30 is considered to be where the threads 32 of the screw terminate. The screw end portion 74 intermediate the threads 32 and the more extreme tip portion 74 essentially has a smooth cylindrical surface 34.

At a location just behind where the flat walls 78 of tip portion 74 terminate, screw 30 has an annular recess 36. Annular recess 36 has a radial depth within screw 36 such that it receives and secures a thrust containment member 92. In the preferred absorption assembly 90, thrust containment member 92 is of the "E-ring" type such as shown in FIG. 3. It is common in the industry to implement a thrust containment device with an "E-ring". It is contemplated that "C-clips", retaining rings and like equivalents known to those of ordinary skill in the art are substitutable for the E-ring 92.

The E-ring 92 has a degree of elasticity so that it can be expanded for mounting on screw 30, within annular recess 36, whereafter, it assumes its original shape. Preferably, the E-ring 92 is free to rotate about the screw within annular recess 36, although as will be seen, preferably, the E-ring is sheltered from rotation motion to a large extent. It is appreciated that E-ring 92, by its receipt within annular recess 36, substantially is immobile along the axial direction of screw 30. Another element of assembly 90 limits radial expansion of the E-ring 92.

The remaining components of thrust absorption assembly 90 are intermediate of E-ring 92 and guide rail 40, and next include a retainer member 94 that concentrically fits over the thrust containment element 92 to circumferentially surround the thrust containment element. The retainer 94 is the component that limits or substantially prevents the thrust containment member 92 from radially expanding and dislocating from recess 36 in response to absorption of a thrust load. As best seen from FIG. 2B, preferred retainer element 94 has a radial wall 96 with an opening 98 to receive the end portion 74 of screw 30 therethrough, and an integral, cylindrical, axial wall 100, the inner surface of which faces the thrust containment member 92 and prevents the thrust containment member from outwardly expanding as thrust is being absorbed.

Next, in contact with the radial wall 96 of the retainer member 94, the first of a pair of convex bellville springs 102, 104 is provided. Bellville springs 102, 104 are arranged such that their concave sides 106 face in opposition. Paired bellville springs 102, 104 dampen the load ultimately stopped by the thrust containment member 92, before the full impact reaches the thrust containment member. Bellville springs 102, 104 are freely rotatably upon screw end portion 74.

In focusing on absorbing the impact load upstream of the thrust containment member 92, those of ordinary skill in the art will recognize that other materials that provide impact-dampening resiliency also could be available to substitute for the bellville springs 102, 104. For example, a rubber or neoprene element could be present at this point in the thrust absorption assembly 90. Also, a coil spring or stacked wave washer members have been contemplated. However, bellville springs 102, 104 have been preferred due to their resistance to wear as opposed to rubber and neoprene materials which tend to wear much quicker, and wave washers that tend to lose resiliency over time. Moreover, springs 102, 104 require less linear space than a coil spring. Preferred bellville springs 102, 104 are contemplated to greatly extend the life of the thrust absorption assembly 90.

Figure 8:
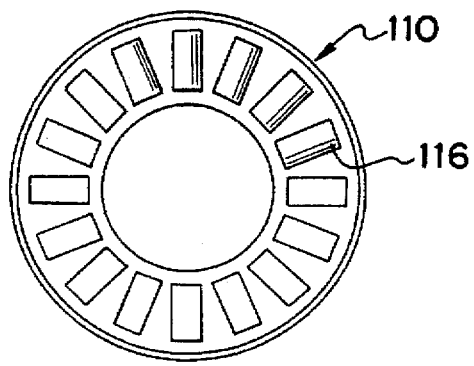
FIG. 8 is a front view of a thrust bearing assembly useful in the thrust absorption assembly shown in FIG. 3.
Figure 9:
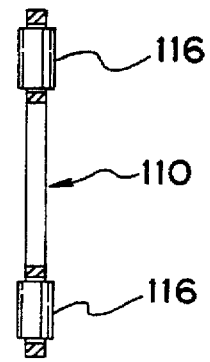
FIG. 9 a side sectional view of the thrust bearing shown in FIG. 8.

The final sub-assembly that makes up the part of preferred thrust absorption assembly 90 incorporates a needle thrust bearing device 110. An exemplary needle thrust bearing device 110 is shown in greater detail in FIGS. 8 and 9. Preferred needle thrust bearing 110, in the industry, is referred to as a Torrington® (The Torrington Company) style needle thrust bearing. On either side of needle thrust bearing 110, a standard washer 112, 114 or the like is provided. The washers shield the needle thrust bearing member 110 from the guide rail assembly 40 on the one side, and the bellville spring 104 on the other. Preferred needle thrust bearing member 110 provides two distinct advantages for the thrust absorption assembly 90. First, it provides line contact, by way of the plurality of rollers 116 thereof to maximize thrust impact distribution across a larger area. It is minimum thickness to accomplish such load distribution. Second, because it is freely rotatable on screw 30, it buffers E-ring 92 from rotation of the screw 30 with respect to guide rail 40. This is desirable as otherwise, if E-ring 92 rotated on screw 30, it would tend to carve further into the screw and degrade the screw. Those of ordinary skill in the art will appreciate that other bearing assemblies also may suffice in place of needle thrust bearing 110. For example, a roller ball assembly also might be substituted for the thrust bearing 110. However, it has been found that a roller ball assembly may not be capable of absorbing impact to a desirable degree. Moreover, a roller ball assembly has point contact between the balls and the washers as opposed to the full line contact between the rollers 116 and the protective members 112, 114 provided by preferred needle thrust bearing member 110.

With the object of extending the life of the thrust absorption assembly 90, it has been found advantageous to ensure lubrication of the several elements making up the assembly. In preferred operator 10, retainer member 94 is implemented from an oil impregnated powder metal. Oil impregnation at 18% by volume has been found to be effective for lubrication of the assembly 90. However, as those of ordinary skill in the art will recognize, other percentages by volume also can suffice. It also is contemplated that retainer member 94 could be formed from steel, plastic and like rigid materials. As such, other lubrication arrangements could be made as would be apparent to those of ordinary skill.

With reference now primarily to FIG. 2A, at the rearward rotor shaft 26R, preferred operator 10 includes an assembly 120 resistant to back drive of the motor 20. Here, anti-back drive assembly 120 is shown in connection with preferred screw drive operator 10. However, as will be appreciated, anti-back drive unit 120 likewise could be applied to a chain drive operator.

Anti-back drive assembly 120 minimizes the number of individual components necessary to accomplish back drive prevention. As described earlier, back drive results from unauthorized attempts at entry through a door held closed by the door operator.

Anti-back drive assembly 120 includes a cup-like brake member 122 which has a central opening 124 therethrough to receive the rearward rotor shaft 26R. Brake member 122, like the retainer member 94, has a radial wall portion 126 with the opening 124, to which radial wall an axial wall 128 is integrally formed. Axial wall portion 128 had a circular periphery such that from the side, brake member 122 appears cup-like or partially cylindrical. Preferably, brake member 122 is permitted to rotate freely on shaft 26R. Preferred brake member 122 is formed of a material that provides moderate friction while exhibiting great resistance to wear. A preferred material with these properties is a Teflon® (E. I. du Pont de Nemours & Co.) filled nylon known commercially as Nylatron® (The Polymer Corporation), but other materials with these properties are known to those of ordinary skill and available for use in providing member 122.

A bell washer 130, or like rigid member, is mounted in opposition to the brake member 122 to provide a braking surface when the brake member 122 is moved thereagainst by attempted back driving of the motor 20. A biasing element 132, shown as a coil spring in preferred operator 10, biases brake member 122 and braking surface member 130 apart. Brake member 122 is protected from the coil spring by a washer 134. As seen, a conventional ball thrust bearing 136 assembly also is provided between a second washer 138 and the braking surface member 130. In preferred operator 10, the ball thrust bearing assembly 136 again is directed to quieter operation.

As stated, normally, coil spring 132 maintains a gap between braking member 122 and braking surface member 130 in order to prevent friction therebetween. However, during an attempt at unauthorized opening of the door 12, the longitudinal forces transmitted along the screw 30 to the rotor shaft 26F will force the entire rotor assembly 24 rearwardly against the bias of coil spring 132 whereupon brake member 122 will engage brake surface member 130. This frictional contact will prevent unauthorized opening of the door. Preferably, the angle A of the door arm 14 with respect to the slide 52 and partial nut 50, and the anti-back drive assembly 120 discussed hereinabove cooperate to prevent unauthorized back driving of the motor 20.

OPERATION

Door operator 10, equipped for front coupling between the screw 30 and motor 20, in accordance with the present invention greatly simplifies assembly by an end user or an installer. Thrust absorption assembly 90 can be provided on the screw end portion 74 at the time that door operator 10 is shipped to the user or installer. Even if the user or installer were required to actually assemble the thrust absorption elements, this would be a simple matter of merely sliding the needle thrust bearing member 110 and its accompanying protective elements 112, 114 onto the screw 30, and then sliding the bellville springs 102, 104 onto the screw with their correct opposite, orientation, and then sliding the retainer member 94 to come into contact with the bellville spring element 102. Thereafter, the thrust containment member 92 is snapped into place within the annular recess 36 about the screw 30, whereupon the screw and guide rail assembly 40 are prepared for coupling by the single-piece coupling member 60 to the forward rotor shaft 26F. Upon unpacking of the door operator 10, the screw 30 will be contained within its corresponding guide rail assembly 40. This is applicable equally to a single-piece screw, or a sectioned screw. Then, to interconnect the screw 30 and forward rotor shaft 26F, all that is necessary is to insert the tip portion 76 of the forward rotor shaft 26F, and the opposing tip portion 72 of the screw into the recesses 26B and 26A within the coupling member 60 to provide a joint between the rotor shaft and the screw. In the preferred operator 10, where the tip portions 76, 72 of both the forward rotor shaft 26F and the screw 30 are identical, the orientation of the coupling member does not matter. This is because both recesses 68A, 68B within the coupling member then are identical, and differ only by their 90° offset along axis I—I. Once the screw 30 and forward rotor shaft 26F are so connected, all that is necessary is to slide the forward portion 44 of the guide assembly 40 toward the housing H whereupon the guide rail edge comes into contact with the thrust bearing assembly washer 114. Conventional hardware (not shown) then provides for rigid mounting of the guide rail assembly 40 and housing H. As seen, due to the identical recesses 68A, 68B of the coupler 60, and the identical tip portions 72 and 76 of the screw 30 and the forward rotor shaft 26F, it is impossible to couple the screw and the forward rotor shaft in other than the correct manner. Further, in the way in which the screw 30 and the forward rotor shaft 26F are coupled, and in the way that the thrust absorption assembly 90 absorbs thrust transmitted along the screw, the overall door operator 10 is marked by significantly quieter operation and longer life.

As to the anti-back drive arrangement, it is contemplated that assembly thereof is not required of the user or installer.

The present disclosure includes subject matter defined in the appended claims, as well as that of the foregoing description and drawings. Although the present invention has been described in connection with a preferred form thereof and therefore with a certain degree of particularity, it is to be understood that the present disclosure of the preferred form is made only by way of example and that numerous changes in the details of construction, beyond those expressly described herein, may be made, and that changes in the combination and arrangement of parts may be made without departing from the spirit and the scope of the invention as hereinafter claimed.

What is claimed is:

1. A garage door operator comprising:

a motor having a stator and a rotor, said rotor having a shaft which transmits torque developed by said motor;

a threaded screw having an end portion;

a guide rail for at least partially containing said screw, said guide rail having an edge portion;

coupling means for coupling said screw to said rotor shaft and absorbing thrust transmitted along said screw toward said motor when said coupling means couples said screw and said motor, said coupling means including a first coupling and a second coupling, said first coupling including a coupling member for connecting each of said rotor shaft and said screw end portion for transmission of torque from said motor to said screw, and said second coupling including thrust containment means supported by said screw and means disposed intermediate said thrust containment means and said guide rail edge portion.

2. A door operator as claimed in claim 1, wherein said thrust containment means includes a thrust containment member disposed on said screw so as to be substantially immovable axially along said screw.

3. A door operator as claimed in claim 2, wherein said intermediate means includes bearing means disposed on said screw so as to contact said guide rail edge portion, and resilient means disposed on said screw between said bearing means and said thrust containment member.

4. A door operator as claimed in claim 3, wherein said bearing means includes a needle thrust bearing assembly, and wherein said resilient means includes spring means.

5. A coupling assembly for a garage door operator having a motor with a rotor shaft which transmits torque developed by the motor, a threaded screw having an end portion, and a guide rail for at least partially containing the screw, the guide rail having an edge portion, said coupling assembly comprising:

a first coupling including a coupling member for connecting the screw to the motor for torque transmission from the motor to the screw, and a second coupling including a thrust containment means disposable on the screw, and intermediate means disposable on the screw to come into contact with the guide rail edge portion, said intermediate means, on the screw, being intermediate said thrust containment means and the guide rail edge portion.

6. A coupling assembly as claimed in claim 5, wherein said thrust containment means includes a thrust containment member disposable on the screw so as to be substantially immovable axially along the screw.

7. A coupling assembly as claimed in claim 6, wherein said intermediate means includes bearing means disposable on the screw so as to contact the guide rail edge portion, and resilient means disposable on the screw between said bearing means and said thrust containment member.

8. A coupling assembly as claimed in claim 7, wherein said bearing means includes a needle thrust bearing assembly, and wherein said resilient means includes spring means.

* * * * *